O. COOLEY.
BELT-TIGHTENER.
No. 171,354.  Patented Dec. 21, 1875.
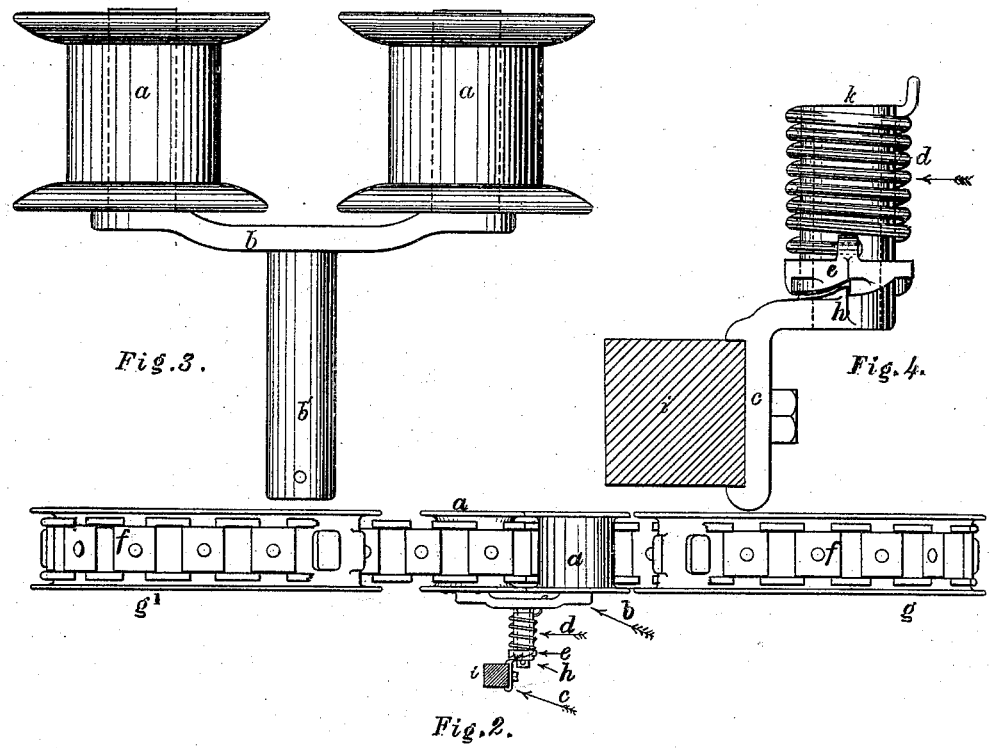
Fig. 3.    Fig. 4.
Fig. 2.
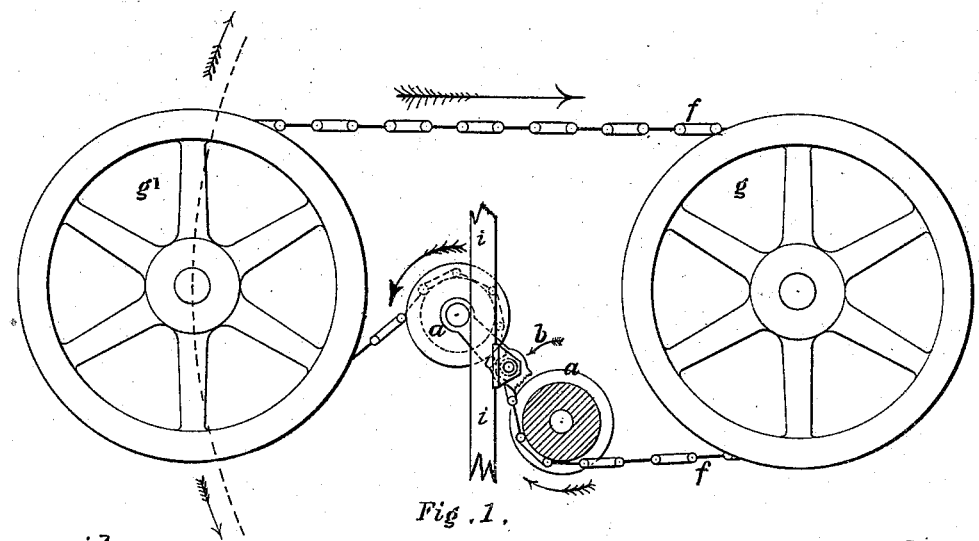
Fig. 1.
Witnesses:  
Inventor  
Orville Cooley.

UNITED STATES PATENT OFFICE.

ORVILLE COOLEY, OF BROCKPORT, N. Y., ASSIGNOR TO THE JOHNSTON HARVESTER COMPANY, OF SAME PLACE.

IMPROVEMENT IN BELT-TIGHTENERS.

Specification forming part of Letters Patent No. 171,354, dated December 21, 1875; application filed March 29, 1875.

*To all whom it may concern:*

Be it known that I, ORVILLE COOLEY, of Brockport, in the county of Monroe and State of New York, have invented certain new and useful Improvements in a Combined Tightener, Stripper, and Guide for Belts and Endless Chains; and I do hereby declare the following to be a full, clear, and exact description of the same, reference being had to the accompanying drawings forming part of this specification, in which—

Figure 1 is a side elevation, showing one roller in section. Fig. 2 is a top plan of the devices shown in Fig. 1. Fig. 3 is a plan of the flanged rollers and forked arm upon which they are mounted, and Fig. 4 is a plan of the socket or casting which supports the forked arm, and of the spring and adjusting ratchet by which the tension of the belt or chain is regulated.

Similar letters of reference in the accompanying drawings denote the same parts.

In machines where power is transmitted from one wheel to another by means of belts, endless cable-chains, sprocket-chains, and other similar devices, and where the position of the wheels with relation to each other is variable, as, for example, in harvesting-machines, and other agricultural machines, in which the driving-wheels are arranged upon the main axle or frame, while a part of the mechanism to be driven is arranged upon an adjustable platform or frame, it has been found almost practically impossible heretofore to keep the belt or chain at the proper uniform tension, when the position of the driven wheels with relation to the driving-wheel is varied. In some positions of the adjustable platform or frame, the belt or chain is, perhaps, too tight, while in others it is so loose that, if a belt, it ceases to apply the power, and if a chain it does not strip properly from the sprocket-teeth of the driving-wheel, nor guide properly to the teeth of the driven wheel, nor apply the power evenly and uniformly, but at times allows the chain to wind upon the driving-wheel till something breaks, at other times does not present the links properly to the sprocket-teeth of the driven wheel, and so allows the chain to slip, and at all times allows the driven wheel to run irregularly, so as to jerk upon the chain and other machinery, frequently doing damage thereto, and always working unsatisfactorily.

The object of my invention is to remedy these difficulties by the construction and application of a device which will properly strip the chain from the teeth of the driving-wheel, guide it to the teeth of the driven wheel, and hold the chain or belt tight, by means of a yielding self-adjustable pressure thereon.

To these ends my invention consists, first, in causing the lower part of the belt or chain to run between two connected rollers or pulleys, one of which presses downward, while the other presses upward upon it, for the purpose of giving it the proper tension; secondly, in arranging said two rollers so that one will operate to strip the chain from the driving-wheel, while the other guides it to the driven wheel; thirdly, in the mode of connecting the two rollers or pulleys, so that they will press upward and downward upon the belt or chain with equal pressure, however that pressure may be varied; and, fourthly, in the mode of adjusting and regulating the tension produced by the pulleys.

In the drawings, $g$ is the driving-wheel; $g'$, the driven wheel, which may be raised or depressed in the arc of the circle shown in the dotted lines passing through its center, or in any other arc or line within practicable limits; $f$, the sprocket-chain by which the former wheel drives the latter; and $i$ a standard suitably arranged for supporting the devices which form the subject of my invention.

Said devices are as follows: $c$ is a bracket or plate adapted for attachment to, and, if necessary, adjustment vertically or laterally upon the standard $i$, and provided with a hollow arm or socket $k$. $b$ is a forked supporting-arm, the stem $b'$ of which fits into the hollow socket $k$, so as to rotate or oscillate freely therein. $a\ a$ are two flanged pulleys or rollers, supported and rotating freely upon the two branches of the arm $b$, as shown in Fig. 3. $d$ is a spring, one end of which is properly secured to the bracket or plate $c$, or its hollow arm $k$, and the other end of which bears upon the arm $b$, so that the torsion of the spring will cause the arm $b$ to turn on its axis. $h$ is a ratchet shoulder formed on the bracket c, toward the spring d, and e is a ratchet collar or ring, mounted loosely on the hollow arm k, and provided on one side with ratchet-teeth that engage with the shoulder h, and on the other side with a lug to which the end of the spring d is secured. If the opposite end of the spring be held fast, and the ring e be turned on the arm k, the torsion of the spring can be increased or decreased at will, and when the turning ceases, the spring will press the ring e against the shoulder h, and hold the torsion, as thus adjusted, until some further adjustment be made. The form and details of construction of these parts may be varied according to circumstances. If a cable-chain be employed at f, the wheels or pulleys a a will operate better with a double groove—that is to say, with another circumferential groove extending around them about midway between their end flanges, so as to accommodate the projecting parts of the chain as they pass around the pulleys.

These parts being thus constructed are applied to the belt or chain, as clearly shown in Figs. 1, 2, so that the belt or chain, moving from the wheel g, will pass under one of the pulleys, then up between them, then over the other pulley, and then to the wheel g', although, for any sufficient reason, this order may be varied or reversed. The torsion of the spring d is then adjusted, which causes one of the pulleys to press downward, and the other to press upward upon the chain f, the degree of pressure varying with the torsion of the spring.

The operation of the device is as follows: The lower pulley a strips the chain from the sprocket-teeth of the wheel g, thereby preventing it, when very slack, from being carried up on the side of the wheel, and perhaps winding around it and breaking the machinery. The two pulleys, pressing in opposite directions, tighten the belt or chain to any degree that may be required, which degree is determined by the adjustment of the spring d, as above described. The two pulleys a a also serve to keep the chain from twisting, so that when it runs off of the upper pulley its links are exactly parallel to the surface of the wheel g' at the point where it meets said wheel, and its proper connection with the sprocket-teeth is thus rendered more certain. Moreover, the tension upon this part of the chain draws it tight between the sprocket-teeth of the wheel g' and the surface of the upper pulley, so that the advancing links of the chain exactly register with the advancing teeth of the wheel. The upper pulley, raising the chain or belt nearly to the line of the center of the wheel g', causes them to operate in contact with a greater extent of the periphery of the wheel, and with a greater number of sprocket-teeth, thereby insuring greater certainty of operation, and distributing the strain over a greater number of said teeth.

When the position of the wheel g or g' is varied in such a way as to slacken the chain or belt, the pulleys a a move nearer to a vertical line, or even past such line, and take up the slack, and when the position of either wheel is varied so as to tighten the belt or chain, the spring d yields and the tightened belt or chain moves the pulleys nearer to a horizontal line, so as to pass more directly and freely between them, and thus let out the slack of the chain or belt, the device always adjusting itself instantly to the requirements of the machine that is in operation.

The device is simple, compact, neat in appearance, and can be arranged so as not to occupy any available room, or be in the way of any of the other working parts. In harvesting-machines and other agricultural machines where endless chains are employed, it will be of great value, saving to every manufacturer large sums of money, which now have to be expended in repairing damages to machinery caused by the slacking of the chains, as above set forth.

I claim as my invention—

1. The combination of two connected and pivoted pulleys, with a belt or chain passing between them and pressed in opposite directions by them, and a spring for applying the pressure to said pulleys, in the manner herein shown, for the purposes specified.

2. The combination of two connected and pivoted pulleys, with a belt or chain passing between them and pressed in opposite directions by them, and an adjustable spring for applying the pressure to said pulleys, substantially as described, for the purposes set forth.

3. The combination of the support c k, the forked arm b b', and the pulleys a a, with the torsional spring d, in the manner and for the purposes substantially as shown and described.

4. The notched ring e, combined with the support c k, the spring d, and the pulleys a a, mounted on the arm b b', substantially as described, for the purposes specified.

5. The combination of a pulley, a, arranged to strip the chain from the driving-wheel, a second pulley, a, arranged to raise the chain and guide it to the driven wheel, with a chain passing between the pulleys, and a spring, or its equivalent, for applying the pressure and taking up the slack of the chain, substantially as and for the purposes set forth.

ORVILLE COOLEY.

Witnesses:
C. D. DEWEY,
F. S. STEBBINS.